(12) United States Patent
De Boer et al.

(10) Patent No.: US 8,623,130 B2
(45) Date of Patent: Jan. 7, 2014

(54) SULPHUR CEMENT PRE-COMPOSITION AND SULPHUR CEMENT PRODUCT

(75) Inventors: Paul De Boer, Amsterdam (NL); Michael David Lankshear, Amsterdam (NL); Guy Lode Magda Maria Verbist, Amsterdam (NL)

(73) Assignee: Shell Oil Company, Houston, TX (US)

( * ) Notice: Subject to any disclaimer, the term of this patent is extended or adjusted under 35 U.S.C. 154(b) by 358 days.

(21) Appl. No.: 13/146,472

(22) PCT Filed: Jan. 28, 2010

(86) PCT No.: PCT/EP2010/051037
§ 371 (c)(1),
(2), (4) Date: Aug. 22, 2011

(87) PCT Pub. No.: WO2010/086391
PCT Pub. Date: Aug. 5, 2010

(65) Prior Publication Data
US 2011/0290157 A1    Dec. 1, 2011

(30) Foreign Application Priority Data
Jan. 29, 2009  (EP) .................................... 09151599

(51) Int. Cl.
*C09D 1/00* (2006.01)
*E01C 7/30* (2006.01)
*C04B 24/42* (2006.01)
*C04B 28/36* (2006.01)
*C09D 7/12* (2006.01)
*C04B 103/65* (2006.01)

(52) U.S. Cl.
CPC ................ *C09D 1/00* (2013.01); *C09D 7/1233* (2013.01); *E01C 7/30* (2013.01); *C04B 24/42* (2013.01); *C04B 28/36* (2013.01); *C04B 2103/65* (2013.01)
USPC .............. 106/287.1; 106/287.11; 106/287.13; 106/287.14; 106/287.15; 106/287.16

(58) Field of Classification Search
USPC ............... 106/287.1, 287.11, 287.13, 287.14, 106/287.15, 287.16
See application file for complete search history.

(56) References Cited

U.S. PATENT DOCUMENTS

| 4,164,428 | A | * | 8/1979 | Simic ....................... 106/287.13 |
| 4,376,830 | A | | 3/1983 | Nimer et al. ................... 501/140 |
| 6,194,594 | B1 | * | 2/2001 | Gorl et al. ...................... 556/427 |
| 2005/0263037 | A1 | | 12/2005 | Chatterji et al. .............. 106/677 |

FOREIGN PATENT DOCUMENTS

| EP | 0804919 | 11/1997 | |
| WO | WO2006103248 | 10/2006 | ............. C01B 17/04 |
| WO | WO-2007/065920 | * 6/2007 | |
| WO | WO2007065920 | 6/2007 | ............. C01B 17/04 |
| WO | WO2008148804 | 12/2008 | ............. C04B 24/42 |
| WO | WO2008152054 | 12/2008 | ............. C04B 28/36 |

OTHER PUBLICATIONS

Czarnecki, B. et al.; "The Effect of Mix Design on the Properties of Sulfur Concrete"; *Cement, Concrete, and Aggregates*, American Society for Testing and Materials; vol. 12, No. 2; pp. 79-86; Jan. 1, 1990.
Anani, A., et al.; "A binary System for Sulfur Modification"; 6001 Chemical Abstracts; vol. 102, No. 2, pp. 296, Jan. 14, 1985.
Anani, A. et al; Proc. Arab. Reg. Conf. Sulphur its Usages Arab World $1^{st}$ Kuwait Inst. Sci. Res., p. 261-298, 1982.

* cited by examiner

*Primary Examiner* — David M Brunsman
(74) *Attorney, Agent, or Firm* — Charles W. Stewart

(57) ABSTRACT

A sulphur cement pre-composition, comprising sulphur, a first organosilane and a second organosilane, and a sulphur cement product comprising sulphur, a particulate inorganic material, a first organosilane and a second organosilane are disclosed. The first organosilane comprises one or more functional groups chosen from thiol, sulphide, amine or alkenyl groups. The second organosilane does not comprise any thiol, sulphide, amine or alkenyl groups. Processes for making the sulphur cement pre-composition and the sulphur cement product are also disclosed.

20 Claims, No Drawings

SULPHUR CEMENT PRE-COMPOSITION AND SULPHUR CEMENT PRODUCT

PRIORITY CLAIM

The present application is a national stage filing of PCT/EP2010/051037, filed 28 Jan. 2010, which claims priority from European Application 09151599.9, filed 29 Jan. 2009.

FIELD OF THE INVENTION

The present invention provides a sulphur cement pre-composition and a process for the preparation of a sulphur cement pre-composition. The invention further provides a sulphur cement product and a process for the preparation of a sulphur cement product.

BACKGROUND OF THE INVENTION

Sulphur cement generally refers to a product comprising at least sulphur and a filler. To improve the properties of the sulphur cement, the sulphur may be modified using a sulphur modifier, e.g. naphthalene or olefinic compounds such as 5 ethylidene-2-norbornene (ENB) or 5 vinyl-2-norbornene (VNB), dicyclopentadiene, limonene or styrene. Usual sulphur cement fillers are particulate inorganic materials.

Sulphur cement-aggregate composites generally refer to a composite comprising both sulphur cement and aggregate. Examples of sulphur cement-aggregate composites are sulphur mortar, sulphur concrete and sulphur-extended asphalt.

It is known to use organosilane compounds as a stabilising agent in sulphur cement or sulphur cement-aggregate compositions to improve water stability. In U.S. Pat. No. 4,164,428 for example, a modified sulphur composition (often referred to as plasticized sulphur composition) comprising at least 50% by weight of sulphur, a sulphur modifier (often referred to as sulphur plasticizer), a finely divided particulate mineral suspending agent, and an organosilane stabilising agent is disclosed. It is mentioned that suitable organosilanes have the general molecular formula R—Si(OR')$_3$, wherein R' is a low molecular weight alkyl group and R is an organic radical having at least one functional group, usually bonded to the silicon atom by a short alkyl chain. Gamma-mercaptopropyltrimethoxysilane is mentioned as a preferred organosilane.

In U.S. Pat. No. 4,376,830 a sulphur cement-aggregate composition comprising a sulphur cement and an aggregate containing an expansive clay and processes for preparing such compositions are disclosed. The processes, and resulting compositions, are characterised by the addition of certain organosilane compounds in the composition prior to solidifying (cooling) the composition. It is mentioned that suitable organosilanes have the formula Z—Si($R_1R_2R_3$), wherein $R_1$, $R_2$ and $R_3$ may be lower alkoxy groups and Z is an organic radical attached to Si via a carbon atom and has at least one molten-sulphur reactive group. Z may for example be mercaptoalkyl. Gamma-mercaptopropyltrimethoxysilane is mentioned as a preferred organosilane.

In WO 2007/65920, sulphur cement or a sulphur cement-aggregate composite is prepared by admixing an inorganic filler and a polysulphide-containing organosilane, mixing with molten sulphur and solidifying the admixture. This process provides sulphur cement or a sulphur cement-aggregate composite with lower water uptake. A preferred polysulphide-containing organosilane is bis(3-triethyoxysilylpropyl)tetrasulphide.

In WO 2008/148804, a sulphur cement pre-composition is prepared by mixing sulphur with a polysulphide-containing organosilane. The sulphur cement pre-composition can be mixed with particulate inorganic material to provide a sulphur cement product. The sulphur cement products have improved water uptake behaviour. A preferred polysulphide-containing organosilane is bis(3-triethyoxysilylpropyl)tetrasulphide.

The polysulphide-containing organosilanes can be used to provide sulphur cement products with low water uptake. However, these organosilanes are expensive and it would be desirable to use less expensive organosilane coupling agents and to have a greater choice of organosilane coupling agents. Additionally it is desirable to avoid the use of organosilanes such as Gamma mercaptopropyltrimethoxysilane, which has an unpleasant smell and has to be handled with care (dissociation of hydrogen from the organosilane can lead to hydrogen sulphide evolution upon contact with sulphur). The present inventors have sought to provide alternative methods for preparing sulphur cement products, whilst retaining low water uptake properties.

SUMMARY OF THE INVENTION

Accordingly, the present invention provides a sulphur cement pre-composition, comprising sulphur and a first organosilane, having general formula (I) or (II):

$$(R^1O)_3Si\text{-}A \quad\quad (I)$$

$$(R^1O)_3Si\text{-}A'\text{-}Si(OR^2)_3 \quad\quad (II)$$

wherein $R^1$ and $R^2$ are $C_{1-6}$ alkyl, A is a univalent functional group comprising one or more groups chosen from thiol, sulphide, amine or alkenyl groups, and A' is a divalent functional group comprising one or more groups chosen from thiol, sulphide, amine or alkenyl groups; and comprising a second organosilane, having general formula (III) or (IV):

$$(R^3O)_3Si\text{—}B \quad\quad (III)$$

$$(R^3O)_3Si\text{—}B'\text{—}Si(OR^4)_3 \quad\quad (IV)$$

wherein $R^3$ and $R^4$ are $C_{1-6}$ alkyl, B is a univalent functional group that does not comprise any thiol, sulphide, amine or alkenyl groups and B' is a divalent functional group that does not comprise any thiol, sulphide, amine or alkenyl groups.

In a further aspect, the invention provides a sulphur cement product, comprising sulphur, a particulate inorganic material, a first organosilane having general formula (I) or (II) and a second organosilane having general formula (III) or (IV).

In a yet further aspect, the invention provides a process for the preparation of a sulphur cement pre-composition, comprising admixing sulphur with a first organosilane having general formula (I) or (II) and a with a second organosilane having general formula (III) or (IV).

In a yet further aspect, the invention provides a process for the preparation of a sulphur cement product comprising the steps of:

(a) admixing sulphur with a first organosilane having general formula (I) or (II) and a second organosilane having general formula (III) or (IV), and with a particulate inorganic material at a temperature at which sulphur is molten to obtain a molten sulphur cement product; and (b) solidifying the molten sulphur cement product.

Reference herein to a sulphur cement pre-composition is to a composition, which after addition of at least one of sulphur or a particulate inorganic material forms a sulphur cement product, e.g. a sulphur cement, a sulphur mortar, sulphur concrete or sulphur-extended asphalt.

The first organosilane comprises an "active" functional group chosen from thiol, sulphide, amine or alkenyl groups and the inventors believe that these groups can react with sulphur. The second organosilane does not comprise these functional groups. The first organosilane is typically more effective at lowering water uptake than the second organosilane. However, the inventors have found that by using a blend of the first and second organosilanes, lower water uptake can be achieved than would be expected based upon the performance of the individual organosilanes. The decrease in water uptake is greater than that predicted by a simple model wherein the total water uptake is the mass weighted average of the water uptake achieved by the individual organosilanes.

Decreased water uptake is significant because water intrusion into sulphur-cement aggregate materials can lead to decay of the material, e.g. by the mechanism of freeze-thaw aging.

DETAILED DESCRIPTION OF THE INVENTION

The sulphur cement pre-composition according to the invention comprises sulphur and a first organosilane, having general formula (I) or (II) and a second organosilane, having general formula (III) or (IV):

$(R^1O)_3Si-A$      (I)

$(R^1O)_3Si-A'-Si(OR^2)_3$      (II)

$(R^3O)_3Si-B$      (III)

$(R^3O)_3Si-B'-Si(OR^4)_3$      (IV)

$R^1$, $R^2$, $R^3$ and $R^4$ are independently $C_{1-6}$ alkyl and are preferably ethyl or methyl groups.

A is a univalent functional group comprising one or more groups chosen from thiol, sulphide, amine or alkenyl groups. Preferably, A is a thiol group or sulphide group, having the formula $-(CH_2)_p-S_q-(CH_2)_r-H$, wherein p is an integer from 1 to 4, q is an integer from 1 to 8 and r is 0 or an integer from 1 to 4. In one embodiment, q is 1 and r is 0, such that A is a thiol group. In another embodiment, q is from 2 to 8 and r is from 1 to 4, such that A is a polysulphide group. In another preferred embodiment, A is a primary amine group of formula $-(CH_2)_n-NH_2$, wherein n is an integer from 1 to 4. In yet another preferred embodiment, A is an alkenyl group of formula $-(CH_2)_m-X$, wherein m is an integer from 0 to 4 and X is an alkenyl group. Possible X groups are shown below:

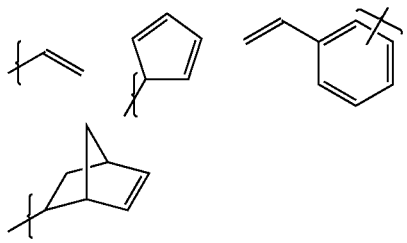

A' is a divalent functional group comprising one or more groups chosen from thiol, sulphide, amine or alkenyl groups. Preferably A' is a sulphide group of formula $-(CH_2)_x-S_y-(CH_2)_z-$ wherein x is an integer from 1 to 4, y is an integer from 2 to 8, and z is an integer from 1 to 4. Most preferably x and z are the same and y is from 2 to 6.

Particularly preferred first organosilanes are bis(3-triethoxysilylpropyl)tetrasulphide and bis(3-triethoxysilylpropyl)disulphide.

B is a univalent functional group that does not comprise any thiol, sulphide, amine or alkenyl groups. Preferably B is a $C_{1-24}$ alkyl group or an aryl group, such as a phenyl group, that is optionally substituted with halo groups, ether groups or epoxy groups. Most preferably B is $C_{1-24}$ alkyl, phenyl or $C_{1-24}$ haloalkyl.

B' is a divalent functional group that does not comprise any thiol, sulphide, amine or alkenyl groups. Preferably B' is a $C_{1-24}$ alkylene group or arylalkylene group, that is optionally substituted with halo groups, ether groups or epoxy groups.

Preferably, the sulphur cement pre-composition comprises at least 0.01 wt % of the first organosilane and at least 0.01 wt % of the second organosilane based on the weight of the total composition. More preferably, the sulphur cement pre-composition comprises in the range of from 0.01 to 40 wt %, yet more preferably from 0.01 to 20 wt %, even more preferably from 0.01 to 10 wt % and most preferably 0.01 to 1 wt % of the first organosilane, and in the range of from 0.01 to 40 wt %, yet more preferably from 0.01 to 20 wt %, even more preferably from 0.01 to 10 wt % and most preferably 0.01 to 1 wt % of the second organosilane, based on the weight of the total composition. The preferred amount of first and second organosilanes is largely determined by the intended use of the sulphur cement pre-composition. For example, if the sulphur cement pre-composition is combined with filler and with further sulphur to form a sulphur cement, then the weight percentage of first and second organosilanes is likely to be high, e.g. from 0.1 to 40 wt %, because the sulphur cement pre-composition is effectively a concentrate of the sulphur plus coupling agent. Conversely, if the sulphur cement pre-composition is combined with filler only to form a sulphur cement, then the weight percentage of first and second organosilanes is likely to be lower, e.g. from 0.01 to 1 wt %.

The weight ratio of the first organosilane to the second organosilane in the sulphur cement pre-composition is preferably in the range of from 20:1 to 1:20, more preferably in the range of from 5:1 to 1:5 and most preferably in the range of from 3:1 to 1:3. The preferred ratio is a balance between achieving the lowest water uptake, and limiting the use of the more expensive organosilane component, which is typically the functionalised first organosilane component.

In addition, the sulphur cement pre-composition may comprise a sulphur modifier. Typically, the sulphur cement pre-composition may comprise sulphur modifiers in an amount in the range of from 0.1 to 10 wt % based on the weight of sulphur. Such modifiers are known in the art. Examples of such modifiers are aliphatic or aromatic polysulphides or compounds that form polysulphides upon reaction with sulphur. Examples of compounds that form polysulphides are naphthalene or olefinic compounds such as 5 ethylidene-2-norbornene (ENB) or 5 vinyl-2-norbornene (VNB), dicyclopentadiene, limonene or styrene.

The sulphur cement pre-compositions according to the invention may be advantageously produced off-site and used on-site in small volumes. The sulphur cement pre-composition may contain a concentration of first and second organosilanes, which is higher than the concentration typically used in a process for preparing a sulphur cement product. When used on-site to prepare for instance a sulphur cement product, such a sulphur cement pre-composition may suitably be added in such amounts to an inorganic material that the need for stabilising agent is satisfied. The sulphur cement product may be completed by adding additional sulphur and other ingredients if not sufficiently present in the sulphur cement pre-composition.

The invention further provides a sulphur cement product, comprising sulphur, a particulate inorganic material, a first organosilane having general formula (I) or (II) and a second organosilane having general formula (III) or (IV). Reference herein to a sulphur cement product is to a sulphur cement or a sulphur cement-aggregate composite.

A sulphur cement refers to a composition comprising sulphur or modified sulphur and a filler. Usual sulphur cement fillers are particulate inorganic materials with an average particle size in the range of from 0.1 μm to 0.1 mm. The filler content of sulphur cement may vary widely, but is preferably in the range of from 1 to 50 wt %, based on the total weight of the sulphur cement.

Sulphur cement-aggregate composites refer to a composite comprising both sulphur cement and a particulate inorganic material aggregate. Examples of sulphur cement-aggregate composites are sulphur mortar, sulphur concrete and sulphur-extended asphalt. Mortar comprises fine aggregate, typically with particles having an average diameter between 0.1 and 5 mm, for example sand and does not comprise coarse aggregate. Concrete comprises coarse aggregate, typically with particles having an average diameter between 5 and 40 mm, and optionally comprises fine aggregate. Sulphur-extended asphalt comprises aggregate and a binder that contains filler and a residual hydrocarbon fraction, wherein part of the binder has been replaced by sulphur, usually modified sulphur.

Preferably, the particulate inorganic material in the sulphur cement product has oxide or hydroxyl groups on its surface. Examples of suitable particulate inorganic materials are silica, fly ash, limestone, quartz, iron oxide, alumina, titanic, carbon black, gypsum, talc or mica, sand, gravel, rock or metal-silicates. Such metal silicates are for example formed upon heating heavy metal containing sludge in order to immobilise the metals. More preferably the particulate inorganic material is a silica or a silicate. Examples of such silica or silicates are quartz, sand, metal-silicates (e.g. mica).

The preferred first and second organosilanes for the sulphur cement product are as outlined for the sulphur cement pre-composition. The preferred weight ratio of the first organosilane to the second organosilane in the sulphur cement product are as outlined for the sulphur cement pre-composition.

The sulphur cement product preferably comprises the first organosilane in the range of from 0.001 to 0.2 wt %, more preferably of from 0.01 to 0.2 wt %, and most preferably of from 0.02 to 0.1 wt %, based on the weight of the sulphur cement product, and preferably comprises the second organosilane in the range of from 0.001 to 0.2 wt %, more preferably of from 0.01 to 0.2 wt %, and most preferably of from 0.02 to 0.1 wt %, based on the weight of the sulphur cement product.

The invention further provides a process for the preparation of a sulphur cement pre-composition, comprising admixing sulphur with a first organosilane having general formula (I) or (II) and with a second organosilane having general formula (III) or (IV). The first and second organosilanes may be admixed with the sulphur by any means known in the art. The order of mixing (first and second organosilanes together, or sequentially in either order) is not thought to be important. The first and second organosilanes may first be dissolved in a small amount of solvent, for example an alcohol or a hydrocarbon, in order to facilitate the admixing with the sulphur. The solvent preferably has a boiling point such it evaporates during the admixing step.

Preferably, the sulphur and first and second organosilanes are admixed at a temperature at which sulphur is molten. The temperature at which sulphur is molten is typically above 120° C., preferably in the range of from 120 to 150° C., more preferably in the range of from 125 to 140° C. Mixing at temperatures at which the sulphur is molten may provide a homogeneous distribution of the first and second organosilanes in the sulphur. Preferably the obtained sulphur cement pre-composition is cooled to a temperature at which the sulphur solidifies. The solid sulphur cement pre-composition can be easily stored or transported.

The invention yet further provides a process for the preparation of sulphur cement product, comprising the steps of:
(a) admixing sulphur with a first organosilane having general formula (I) or (II) and a second organosilane having general formula (III) or (IV), and with a particulate inorganic material at a temperature at which sulphur is molten to obtain a molten sulphur cement product; and
(b) solidifying the molten sulphur cement product.

In one embodiment of the process, a sulphur cement product is prepared by admixing in step (a) a sulphur cement pre-composition according to the invention and a particulate inorganic material at a temperature at which sulphur is molten to obtain a molten sulphur cement product. In another embodiment of the process, a sulphur cement product is prepared by admixing in step (a), elemental or modified sulphur, a first organosilane, a second organosilane and a particulate inorganic material, i.e. the sulphur and organosilanes are used as individual components rather than as a sulphur cement pre-composition. The order of mixing (first and second organosilanes together, or sequentially in either order) is not thought to be important.

In one embodiment of the process, in step (a) the first organosilane and/or the second organosilane may first be admixed with the particulate inorganic material in a pre-treatment step, and then subsequently the treated particulate inorganic material is admixed with sulphur (and also with the first organosilane and/or the second organosilane if these were not used in the pre-treatment step). The first and/or second organosilanes are preferably admixed with the particulate inorganic material by dissolving the first and/or second organosilanes in a small amount of solvent, for example an alcohol or a hydrocarbon, and admixing with the particulate inorganic material. The solvent preferably has a boiling point such it evaporates during the admixing step.

Step (a) is carried out at a temperature at which sulphur is molten, i.e. typically above 120° C., preferably in the range of from 120 to 150° C., more preferably in the range of from 125 to 140 C.

Optionally further ingredients such as sulphur modifiers may be admixed during step (a). Preferably, all ingredients of the sulphur cement product are admixed at a temperature at which sulphur is liquid.

In step (b) the molten sulphur cement product is solidified by cooling the product to a temperature at which the sulphur solidifies.

EXAMPLES

The invention is further illustrated my means of the following non-limiting examples.
Preparation of Sulphur Cement Mortars The sulphur cement mortars had the following formulation: sulphur (25%), norm sand (47%) and quartz filler (28%). Sand and filler were pre-heated in an oven at 150° C., sulphur was pre-heated at 65° C. Mixing was carried out in a stainless steel bowl, which is electronically heated. First the sand was put into the bowl after which the organosilane(s) was/were added by spraying over the sand surface using a syringe. After three to five minutes, sulphur was added to the sand and mixed until homogeneous. The mixture was then stirred and heated until the sulphur was molten after which the quartz filler was added to the mix. This mix was stirred until uniform and repeatedly mixed for an exact period of 20 minutes. It was then poured into prism moulds of dimensions 4×4×16 cm and allowed to cool.

The amounts of organosilanes (% on total mortar mix) and ratios used were as in Table 1. TESPT is bis(3-triethyoxysilylpropyl)tetrasulphide. SETMS is styrylethyltrimethoxysilane. PrTES is propyltriethoxysilane. PhTES is phenyltriethoxysilane. OS is organosilane.

TABLE 1

|  | 1st OS |  | 2nd OS |  | OS Weight Ratio 1st:2nd |
|---|---|---|---|---|---|
| Comparative Example 1 | 0 |  | 0 |  | — |
| Comparative Example 2 | 0.06 | TESPT | 0 |  | — |
| Comparative Example 3 | 0.03 | TESPT | 0 |  | — |
| Comparative Example 4 | 0 |  | 0.06 | PrTES | — |
| Example 1 | 0.045 | TESPT | 0.015 | PrTES | 75:25 |
| Example 2 | 0.03 | TESPT | 0.03 | PrTES | 50:50 |
| Example 3 | 0.015 | TESPT | 0.045 | PrTES | 25:75 |
| Comparative Example 5 | 0 |  | 0 |  | — |
| Comparative Example 6 | 0.06 | TESPT | 0 |  | — |
| Comparative Example 7 | 0.03 | TESPT | 0 |  | — |
| Comparative Example 8 | 0 |  | 0.06 | PhTES | — |
| Comparative Example 9 | 0 |  | 0.06 | PhTES | — |
| Example 4 | 0.045 | TESPT | 0.015 | PhTES | 75:25 |
| Example 5 | 0.03 | TESPT | 0.03 | PhTES | 50:50 |
| Example 6 | 0.015 | TESPT | 0.045 | PhTES | 25:75 |
| Comparative Example 10 | 0.06 | TESPT | 0 |  | — |
| Comparative Example 11 | 0.06 | SETMS | 0 |  | — |
| Comparative Example 12 | 0 |  | 0.06 | PrTES | — |
| Example 7 | 0.045 | SETMS | 0.015 | PrTES | 75:25 |
| Example 8 | 0.03 | SETMS | 0.03 | PrTES | 50:50 |
| Example 9 | 0.015 | SETMS | 0.045 | PrTES | 25:75 |

Water Absorption

The sulphur cement mortars were immersed in water. The mass increase was determined and is expressed as a percentage in table 2:

TABLE 2

|  | No. of days immersed in water | % increase in mass |
|---|---|---|
| Comparative Example 1 | 51 | 0.90 |
| Comparative Example 2 | 51 | 0.04 |
| Comparative Example 3 | 51 | 0.27 |
| Comparative Example 4 | 51 | 0.55 |
| Example 1 | 51 | 0.04 |
| Example 2 | 51 | 0.06 |
| Example 3 | 51 | 0.37 |
| Comparative Example 5 | 45 | 0.84 |
| Comparative Example 6 | 45 | 0.04 |
| Comparative Example 7 | 45 | 0.26 |
| Comparative Example 8 | 45 | 0.12 |
| Comparative Example 9 | 45 | 0.16 |
| Example 4 | 45 | 0.013 |
| Example 5 | 45 | 0.03 |
| Example 6 | 45 | 0.08 |
| Comparative Example 10 | 56 | 0.06 |
|  | 84 | 0.07 |
| Comparative Example 11 | 56 | 0.13 |
|  | 84 | 0.17 |
| Comparative Example 12 | 56 | 0.53 |
|  | 84 | 0.60 |
| Example 7 | 56 | 0.12 |
|  | 84 | 0.15 |
| Example 8 | 56 | 0.22 |
|  | 84 | 0.27 |
| Example 9 | 56 | 0.23 |
|  | 84 | 0.25 |

Water intrusion is lowered significantly by incorporation of the TESPT organosilane (see comparative examples 1-3, comparative examples 6-7 and comparative example 10) and is also lowered to a reasonable extent by the incorporation of SETMS organosilane (see comparative example 11). Water intrusion is lowered to a lesser extent by incorporation of the PrTES organosilane (see comparative examples 1 and 4) and to a reasonable extent by incorporation of the PhTES organosilane (see comparative examples 5, 8 and 9).

Surprisingly, by incorporating both TESPT and PrTES, by incorporating both TESPT and PhTES or by incorporating SETMS and PrTES, lower water intrusion is achieved than would be expected based upon the results for TESPT, SETMS PrTES or PhTES alone. Incorporation of a 75:25 mixture of TESPT and PrTES, achieves the same lowering of water intrusion as TESPT alone (see example 1 and comparative example 2) and incorporation of a 50:50 mixture of TESPT and PrTES achieves almost the same water intrusion result (see example 2 and comparative example 2). This is despite the fact that PrTES is significantly less effective at lowering water intrusion than TESPT. Incorporation of a 75:25 or a 50:50 mixture of TESPT and PhTES achieves greater lowering of water intrusion that TESPT alone (see examples 4 and 5, and comparative example 7). This is surprising when PhTES is less effective at lowering water intrusion than TESPT. Incorporation of a 75:25 mixture of SETMS and PrTES achieves about the same lowering of water intrusion as SETMS alone (see example 7 and comparative example 11). Incorporation of a 50:50 or a 25:75 mixture of SETMS and PrTES achieves much better lowering of water intrusion compared to PrTES alone (see examples 8 and 9, and comparative example 12).

What is claimed is:

1. A sulphur cement pre-composition, comprising sulphur and a first organosilane, having general formula (I) or (II):

$$(R^1O)_3Si\text{-}A \qquad (I)$$

$$(R^1O)_3Si\text{-}A'\text{-}Si(OR^2)_3 \qquad (II)$$

wherein $R^1$ and $R^2$ are $C_{1-6}$ alkyl, A is a univalent functional group comprising one or more groups chosen from thiol, sulphide, amine or alkenyl groups, and A' is a divalent functional group comprising one or more groups chosen from thiol, sulphide, amine or alkenyl groups;

and comprising a second organosilane, having general formula (III) or (IV):

$$(R^3O)_3Si\text{—}B \qquad (III)$$

$$(R^3O)_3Si\text{—}B'\text{—}Si(OR^4)_3 \qquad (IV)$$

wherein $R^3$ and $R^4$ are $C_{1-6}$ alkyl, B is a univalent functional group that does not comprise any thiol, sulphide, amine or alkenyl groups and B' is a divalent functional group that does not comprise any thiol, sulphide, amine or alkenyl groups.

2. A sulphur cement pre-composition according to claim 1, wherein the first organosilane is a compound of formula (II) and A' is a sulphide group of formula —$(CH_2)_x$—$S_y$—$(CH_2)_z$— wherein x is an integer from 1 to 4, y is an integer from 2 to 8, and z is an integer from 1 to 4.

3. A sulphur cement pre-composition according to claim 1, wherein the first organosilane is a compound of formula (I) and A is an alkenyl group.

4. A sulphur cement pre-composition according to claim 1 wherein the second organosilane is a compound of formula (III) and B is $C_{1-24}$ alkyl, phenyl or $C_{1-24}$ haloalkyl, or the second organosilane is compound of formula (IV) and B' is $C_{1-24}$ alkylene group, $C_{1-24}$ arylalkylene group or $C_{1-24}$ haloalkylene.

5. A sulphur cement pre-composition according to claim 1 wherein the weight ratio of the first organosilane to the second organosilane is in the range of from 5:1 to 1:5.

6. A sulphur cement product, comprising sulphur, a particulate inorganic material, a first organosilane having general formula (I) or (II):

  (I)

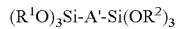  (II)

wherein $R^1$ and $R^2$ are $C_{1-6}$ alkyl, A is a univalent functional group comprising one or more groups chosen from thiol, sulphide, amine or alkenyl groups, and A' is a divalent functional group comprising one or more groups chosen from thiol, sulphide, amine or alkenyl groups;

and a second organosilane having general formula (III) or (IV):

$(R^3O)_3Si$—B  (III)

$(R^3O)_3Si$—B'—$Si(OR^4)_3$  (IV)

wherein $R^3$ and $R^4$ are $C_{1-6}$ alkyl, B is a univalent functional group that does not comprise any thiol, sulphide, amine or alkenyl groups and B' is a divalent functional group that does not comprise any thiol, sulphide, amine or alkenyl groups.

7. A sulfur cement product according to claim 6, wherein the first organosilane is a compound of formula (II) and A' is a sulphide group of formula —$(CH_2)_x$—$S_y$—$(CH_2)_z$— wherein x is an integer from 1 to 4, y is an integer from 2 to 8, and z is an integer from 1 to 4.

8. A sulphur cement pre-composition according to claim 6, wherein the first organosilane is a compound of formula (I) and A is an alkenyl group.

9. A sulphur cement product according to claim 6, wherein the second organosilane is a compound of formula (III) and B is $C_{1-24}$ alkyl, phenyl or $C_{1-24}$ haloalkyl, or the second organosilane is compound of formula (IV) and B' is $C_{1-24}$ alkylene group, $C_{1-24}$ arylalkylene group or $C_{1-24}$ haloalkylene.

10. A sulphur A sulphur cement product according to claim 6, wherein the weight ratio of the first organosilane to the second organosilane is in the range of from 5:1 to 1:5.

11. A process for the preparation of a sulphur cement pre-composition, comprising admixing sulphur with a first organosilane having general formula (I) or (II):

  (I)

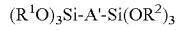  (II)

wherein $R^1$ and $R^2$ are $C_{1-6}$ alkyl, A is a univalent functional group comprising one or more groups chosen from thiol, sulphide, amine or alkenyl groups, and A' is a divalent functional group comprising one or more groups chosen from thiol, sulphide, amine or alkenyl groups;

and a second organosilane having general formula (III) or (IV):

$(R^3O)_3Si$—B  (III)

$(R^3O)_3Si$—B'—$Si(OR^4)_3$  (IV)

wherein $R^3$ and $R^4$ are $C_{1-6}$ alkyl, B is a univalent functional group that does not comprise any thiol, sulphide, amine or alkenyl groups and B' is a divalent functional group that does not comprise any thiol, sulphide, amine or alkenyl groups.

12. A process for the preparation of a sulphur cement pre-composition according to claim 11, wherein x is an integer from 1 to 4, y is an integer from 2 to 8, and z is an integer from 1 to 4.

13. A process for the preparation of a sulphur cement precomposition according to claim 11, wherein the first organosilane is a compound of formula (I) and A is an alkenyl group.

14. A process for the preparation of a sulphur cement pre-composition to claim 11, wherein the second organosilane is a compound of formula (III) and B is $C_{1-24}$ alkyl, phenyl or $C_{1-24}$ haloalkyl, or the second organosilane is compound of formula (IV) and B' is $C_{1-24}$ alkylene group, $C_{1-24}$ arylalkylene group or $C_{1-24}$ haloalkylene.

15. A process for the preparation of a sulphur cement pre-composition according to claim 11, wherein the weight ratio of the first organosilane to the second organosilane is in the range of from 5:1 to 1:5.

16. A process for the preparation of a sulphur cement product comprising the steps of:

(a) admixing sulphur with a first organosilane having general formula (I) or (II):

$(R^1O)_3Si$-A  (I)

$(R^1O)_3Si$-A'-$Si(OR^2)_3$  (II)

wherein $R^1$ and $R^2$ are $C_{1-6}$ alkyl, A is a univalent functional group comprising one or more groups chosen from thiol, sulphide, amine or alkenyl groups, and A' is a divalent functional group comprising one or more groups chosen from thiol, sulphide, amine or alkenyl groups;

and with a second organosilane having general formula (III) or (IV):

$(R^3O)_3Si$—B  (III)

$(R^3O)_3Si$—B'—$Si(OR^4)_3$  (IV)

wherein $R^3$ and $R^4$ are $C_{1-6}$ alkyl, B is a univalent functional group that does not comprise any thiol, sulphide, amine or alkenyl groups and B' is a divalent functional group that does not comprise any thiol, sulphide, amine or alkenyl groups; and with a particulate inorganic material at a temperature at which sulphur is molten to obtain a molten sulphur cement product; and (b) solidifying the molten sulphur cement product.

17. A process for the preparation of a sulphur cement product according to claim 16, wherein x is an integer from 1 to 4, y is an integer from 2 to 8, and z is an integer from 1 to 4.

18. A process for the preparation of a sulphur cement product according to claim 16, wherein the first organosilane is a compound of formula (I) and A is an alkenyl group.

19. A process for the preparation of a sulphur cement product according to claim 16, wherein the second organosilane is a compound of formula (III) and B is $C_{1-24}$ alkyl, phenyl or $C_{1-24}$ haloalkyl, or the second organosilane is compound of formula (IV) and B' is $C_{1-24}$ alkylene group, $C_{1-24}$ arylalkylene group or $C_{1-24}$ haloalkylene.

20. A process for the preparation of a sulphur cement product according to claim 16, wherein the weight ratio of the first organosilane to the second organosilane is in the range of from 5:1 to 1:5.

* * * * *